United States Patent [19]

Haworth et al.

[11] 4,370,008
[45] Jan. 25, 1983

[54] WALL PANEL WITH PREWIRED POWER SYSTEM

[75] Inventors: Richard G. Haworth, Holland; Charles J. Saylor, Zeeland; Harold R. Wilson, Holland, all of Mich.

[73] Assignee: Haworth Mfg., Inc., Holland, Mich.

[21] Appl. No.: 142,911

[22] Filed: Apr. 23, 1980

Related U.S. Application Data

[63] Continuation of Ser. No. 918,278, Jun. 22, 1978, abandoned, which is a continuation of Ser. No. 737,420, Nov. 1, 1976, abandoned, which is a continuation-in-part of Ser. No. 615,506, Sep. 22, 1975, Pat. No. 4,060,294.

[51] Int. Cl.³ .......................................... H01R 13/00
[52] U.S. Cl. ...................................... 339/4; 339/22 R
[58] Field of Search ..................... 339/20, 21, 22, 23, 339/4, 6; 52/221, 239

[56] References Cited

U.S. PATENT DOCUMENTS

| 1,189,435 | 7/1916 | Edmands | 339/29 R |
|---|---|---|---|
| 1,718,253 | 6/1929 | Putman | 52/220 |
| 1,983,157 | 12/1934 | Wermine | 339/159 R |
| 2,039,982 | 5/1936 | Schaller | 52/221 |
| 2,086,641 | 7/1937 | Riley | 339/49 R |
| 2,162,864 | 6/1939 | Rugg et al. | 339/38 |
| 2,210,652 | 8/1940 | Dennett | 45/106 |
| 2,292,394 | 8/1942 | O'Brien | 339/23 |
| 2,305,100 | 12/1942 | O'Brien | 339/22 |
| 2,320,332 | 5/1943 | Morten | 174/74 |
| 2,351,632 | 6/1944 | O'Brien | 339/159 R |
| 2,407,894 | 9/1946 | Miller | 339/38 |
| 2,608,634 | 8/1952 | Abbott | 339/22 R |
| 2,611,800 | 9/1952 | Naughton | 173/334.1 |
| 2,666,907 | 1/1954 | Hensley | 339/22 |
| 2,688,733 | 9/1954 | Walter | 339/4 |
| 3,195,698 | 7/1965 | Cordrea | 52/221 |
| 3,362,005 | 1/1968 | Corns | 339/4 |
| 3,592,289 | 7/1971 | Aysta et al. | 181/30 |
| 3,683,101 | 8/1972 | Liberman | 174/49 |
| 3,695,330 | 10/1972 | Hasbrouck | 160/135 |
| 3,715,627 | 2/1973 | D'Ausilio | 339/156 R |
| 3,841,042 | 10/1974 | Siegal | 52/239 |
| 3,856,981 | 12/1974 | Boundy | 174/48 |
| 3,889,736 | 6/1975 | Firks | 160/135 |
| 3,913,656 | 10/1975 | Guyer | 160/135 |
| 3,984,621 | 9/1975 | Propst | 174/48 |
| 4,001,571 | 1/1977 | Martin | 339/29 R |
| 4,043,626 | 8/1977 | Propst et al. | 339/23 |
| 4,056,297 | 11/1977 | Gartung | 339/23 |
| 4,135,775 | 1/1979 | Driscoll | 339/22 R |

FOREIGN PATENT DOCUMENTS 47852  7/1965  Luxembourg.

OTHER PUBLICATIONS

Modulo 3 System, Sales Brochure, Tiffany Industries, Inc. Maryland Heights, Mo., 9 pages, 12–1974.

Primary Examiner—Neil Abrams
Attorney, Agent, or Firm—Blanchard, Flynn, Thiel, Boutell & Tanis

[57] ABSTRACT

A portable, prefabricated panel adapted to be connected with a plurality of similar panels to form a wall or partition structure. The panel is electrically prewired and includes electrical power blocks disposed adjacent the opposite lower corners of the panel, which power blocks are connected by electrical cables which extend internally of the panel. When two or more panels are connected together, electrical power is transmitted between each adjacent pair of panels by a flexible electrical connector which plugs into the power blocks of the adjacent panels. The panel also has electrical sockets integrally associated therewith, which sockets are preferably associated with the power blocks. The power blocks are symmetrical so that the same electrical connections can be made on either side of the panel. A channel-like raceway extends along the bottom edge of the panel for permitting the hidden storage of communication cables. The panel preferably has a rectangular frame formed from hollow channel-like members which define an interior path around the complete periphery of the panel to facilitate the feeding of cables and conduits along the vertical or horizontal edges of the panel.

30 Claims, 17 Drawing Figures

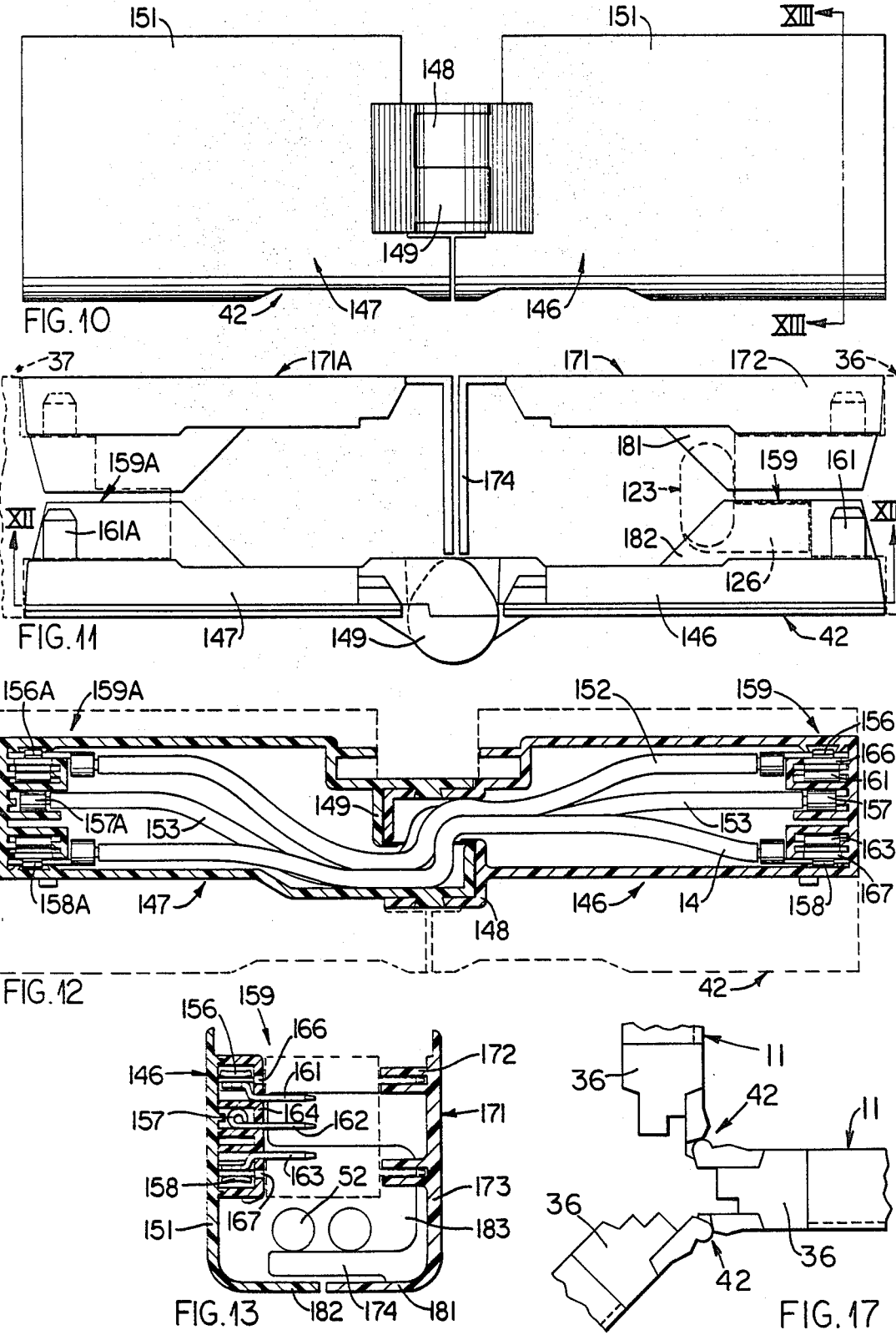

WALL PANEL WITH PREWIRED POWER SYSTEM

CROSS REFERENCE TO RELATED APPLICATION

This is a continuation of application Ser. No. 918,278, filed June 22, 1978, now abandoned, which is a continuation of application Ser. No. 737,420, filed Nov. 1, 1976, now abandoned, which is a continuation-in-part of application Ser. No. 615,506, filed Sept. 22, 1975, now U.S. Pat. No. 4,060,294.

FIELD OF THE INVENTION

This invention relates to a wall or space-divider structure incorporating a plurality of prefabricated panels which have improved structures associated therewith for facilitating the electrical prewiring of the wall structure and the handling of communication cables therein.

BACKGROUND OF THE INVENTION

Our co-pending application Ser. No. 615,506, filed on Sept. 22, 1975, now U.S. Pat. No. 4,060,294 discloses a wall structure which functions as a space-divider system and includes a plurality of prefabricated panels releasably joined together and individually electrically prewired to facilitate the supplying of electrical energy to regions bounded by the wall structure. This wall structure also accommodates communication cables therein. While the wall structure of the above application is highly desirable, nevertheless continued development has been carried out to further improve this structure.

The present invention thus relates to a wall structure of this type wherein additional improvements have been made in the individual prefabricated panels and the manner in which they are prewired, together with the related structures so as to improve both the electrical connection provided by the wall structure and the handling of communication cables thereby.

Accordingly, it is an object of the present invention to provide an improved wall or partition structure formed from a plurality of prefabricated panels releasably joined together, which panels are individually electrically prewired to facilitate the supplying of electrical energy to regions adjacent the wall structure. More specifically, it is an object of the present invention to provide:

1. An improved wall structure, as aforesaid, wherein the individual panels have an improved power block associated with each of the lower corners thereof, which power block simplifies the connection to an external power source.

2. An improved wall structure, as aforesaid, wherein the individual panels have an improved raceway associated with and extending longitudinally along the lower edge thereof, which raceway has removable covers disposed on opposite sides thereof to facilitate access to two interior channels located within the raceway, one of which contains power cables and the other of which is adapted to contain communication cables.

3. An improved wall structure, as aforesaid, wherein the power blocks of adjacent panels are adapted to be electrically joined together by a flexible electrical connector, and wherein the flexible electrical connector and power blocks have an improved plug-and-socket structure coacting therebetween to prevent the plugs from being electrically energized except when they are inserted into an appropriate socket.

4. An improved wall structure, as aforesaid, wherein the raceways, power blocks and flexible connectors provide an improved channel which extends along the bottom of the interconnected panels for receiving and supporting the communication cables, whereby the communication cables are effectively hidden from view yet are readily accessible.

5. An improved wall structure, as aforesaid, wherein the raceway and power blocks are fixedly mounted on the individual panels, and the flexible connectors connected to adjacent panels, facilitate the manufacture and assembly of the panel, and result in a wall structure which is asthetically appealing while possessing extreme practicability and functionality.

6. An improved wall structure, as aforesaid, which facilitates the supplying of electrical energy and the feeding of communication cables to work regions defined adjacent the wall structure, and which provides maximum flexibility and adaptability coupled with optimum safety for the maintenance personnel who assemble the wall.

In the present invention, there is provided an interior wall system for dividing a large area into smaller working areas, which system includes a plurality of portable upright panels horizontally serially connected so that vertical ends of said panels are positioned in close proximity to one another. An electrical power means is formed as an integral part of said wall system for transmitting electrical energy to and between at least some of the serially connected panels. This said power means comprises: first and second substantially identical electrical power blocks fixedly mounted on each said panel of said plurality approximately adjacent the opposite vertical ends thereof, said electrical power blocks being disposed substantially between a pair of substantially parallel vertical planes as defined by the opposite sides of the respective panel; cable means extending between and connected to said first and second electrical power blocks for permitting transmission of electrical energy therebetween; each said power block having identical first and second connection means integrally associated therewith, the two said connection means on said first power block being identical to the two said connection means on said second power block, each said first and second connection means defining one half of a separable electrical connection, said two connection means as associated with each said power block being spaced inwardly from the sides of its respective panel; electrical connector means extending between and connected to an opposed pair of said electrical power blocks as provided on first and second said panels which are disposed adjacent and horizontally serially connected for transmitting electrical energy between said first and second panels, said electrical connector means including a pair of substantially identical third connection means joined together by a center portion which permits said pair of third connection means to be horizontally angularly displaced relative to one another to accommodate the horizontal angular relationship between the serially-connected first and second panels, said third connection means defining one half of said separable electrical connection and being alternatively releasably engageable with either one of said first and second connection means; said connector means, when joined to said opposed pair of power blocks, being disposed substantially between, or flush with parallel vertical planes as defined by the opposed sides of said first and second panels; one of said third connection means being releasably engaged with the first connection means associated with one of the electrical power blocks of said opposed pair as mounted on said first panel, the other said third connection means being releasably engageable with the first connection means associated with the other electrical power block of said opposed pair as mounted on said second panel, whereby said first and second panels are electrically joined together; and said electrical connector means being electrically connectible between said opposed pair of electrical power blocks by being alternatively releasably joined to either the opposed pair of first connection means or the opposed pair of second connection means, but not to both at the same time.

This invention also relates to an upright space divider system having a plurality of interconnected portable upright partitions which are serially joined together so that the vertical edges thereof are adjacent one another, which system includes: means fixedly associated with each of said partitions and defining an elongated channel-like space which extends longitudinally of the respective partition adjacent the lower edge thereof, said space being disposed between a pair of substantially parallel vertical planes which effectively define the opposite side surfaces of the respective partition, and a removable side cover associated with at least one side of said means for permitting access to said elongated space; a pair of substantially identical electrical power block means fixedly mounted on selected ones of said partitions, said pair of power block means being mounted on the respective partition adjacent the opposite ends of the respective space and being disposed substantially between said two vertical planes, each said power block means having first and second identical socket-like means associated therewith and disposed within the region defined between said two vertical planes; flexible electrical connector means extending between two of said selected partitions for electrically joining a first said power block means of a first selected partition to a second said power block means of a second selected partition to enable said first and second partitions to be relatively horizontally angularly moved while being electrically interconnected, said flexible electrical connector means including a first housing part having first electrical plug-like means adapted for engagement with one of the socket-like means associated with the first power block means and a second housing part having second electrical plug-like means adapted for engagement with one of the socket-like means of the second power block means, said flexible connector means when joined between said first and second power block means being engaged solely with said one socket-like means as associated with each said power block means, and said flexible electrical connector means being positioned adjacent the lower edges of said partitions and disposed so as to lie substantially within the vertical boundaries of said partitions; and electrical cable means for supplying electrical energy to one of said first and second power block means from a remote power source, said electrical cable means extending vertically downwardly through the interior of one of said partitions and terminating in a plug-like connector engageable with the other socket-like means of one of said first and second power block means, said plug-like connector being disposed between said planes.

Other objects and purposes of the invention will be apparent to persons familiar with systems of this type upon reading the following specification and inspecting the accompanying drawings.

BRIEF DESCRIPTION OF THE DRAWINGS

FIG. 10 is a side elevational view of the flexible connector used for joining two panels together.

FIG. 11 is a top view of the connector shown in FIG. 10, and showing also the dummy covers which coact with the opposite side of the panels.

FIG. 12 is a sectional view taken along line XII—XII in FIG. 11.

FIG. 13 is a sectional view taken along line XIII—XIII in FIG. 10.

FIG. 17 is a fragmentary view illustrating three panels electrically connected together.

Figure 1:
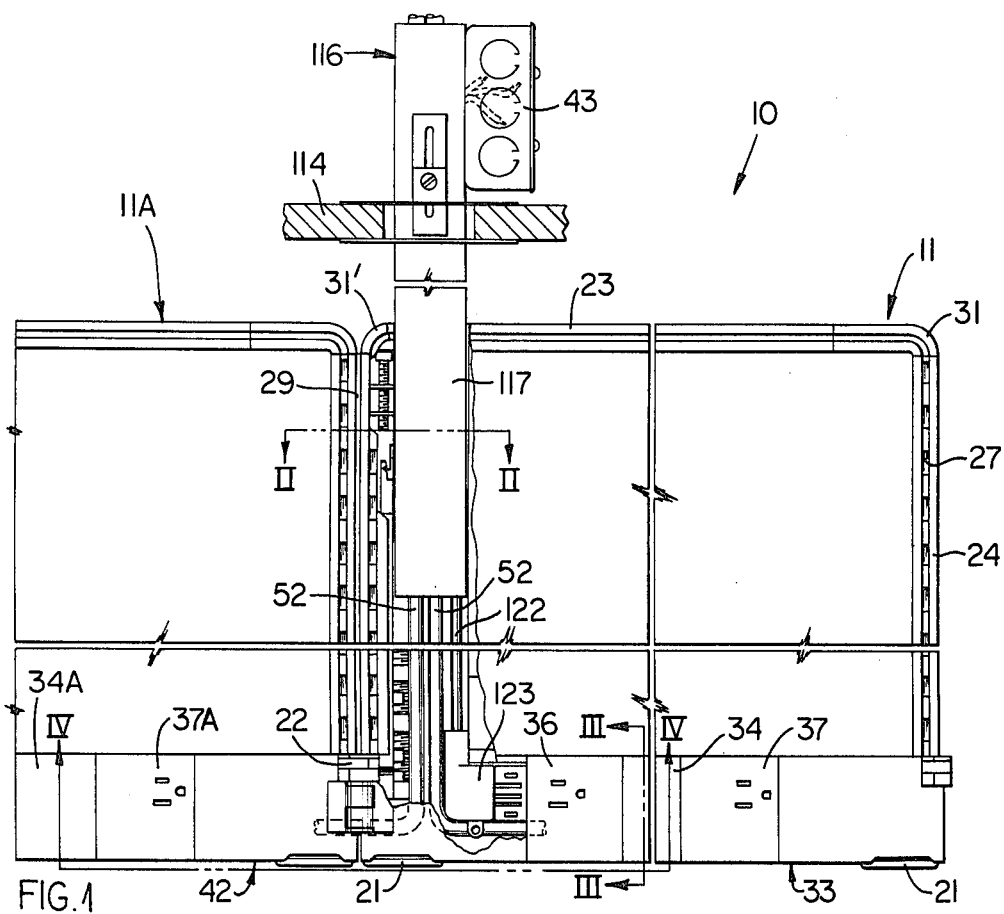
FIG. 1 is an enlarged fragmentary view of a wall or partition system formed from two prefabricated panels, the outer skin of the rightward panel being partially removed to permit illustration of the interior structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of a panel and designated parts thereof. Said terminology will include the words specifically mentioned, derivatives thereof and words of similar import.

SUMMARY OF THE INVENTION

A plurality of prefabricated panels are selectively connected together to form a wall structure having a desired length and configuration. Adjacent panels are connected by a connecting element, such as a hinge, whereby adjacent panels can be aligned or angled relative to one another. Each panel has a raceway fixedly extending along the lower edge thereof. In a preferred embodiment, the opposite ends of the raceway terminate in power blocks which are fixedly associated with the panel adjacent the opposite lower corners thereof. Electrical cables extend through the raceway and are connected to the power blocks. The power blocks of two adjacent panels are electrically connected by a flexible connector having plug portions which are insertable into the power blocks of adjacent panels. The power blocks can accommodate a flexible connector on either side of the panel, whereby a single panel can be electrically connected to two adjacent panels (see FIG. 17). The flexible connectors, like the power blocks, are substantially flush with the sidewalls of the panels so that the resulting wall structure, and specifically the individual panels, have a smooth and streamlined appearance. The individual panels are preferably formed with a hollow rectangular frame whereby the main power cable, which may extend downwardly from the ceiling, can be fed therethrough and interconnect to one of the power blocks.

DETAILED DESCRIPTION

FIG. 1 illustrates a wall structure 10 formed by a pair of substantially identical prefabricated wall panels 11 and 11A. While only two wall panels have been illustrated, it will be appreciated that any desired number of panels can be connected together with the adjacent panels being disposed in aligned or angled relationship.

Figure 2:
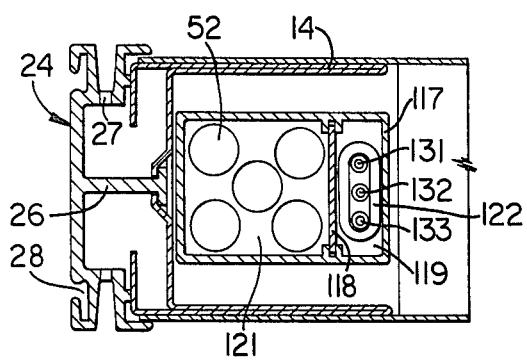
FIGS. 2 and 3 are enlarged, fragmentary sectional views respectively taken along lines II—II and III—III in FIG. 1.

The panel 11 includes an internal rigid rectangular frame formed by parallel top and bottom rails (the bottom rail 13 being illustrated in FIG. 3) rigidly joined together by parallel side rails, one side rail 14 being shown in FIG. 2. These rails are all of a channel-shaped configuration and open inwardly of the panel. The rectangular frame is rigidly joined to a pair of thin facing sheets 16 disposed on opposite sides thereof, which sheets confine a core structure 17 therebetween. This core structure normally comprises a honeycomb layer which totally occupies the region defined within the rectangular frame. The facing sheets 16 may additionally be covered by a suitable exterior material, such as carpeting or an acoustical covering.

The panel 11 also has adjustable feet 21 mounted adjacent the opposite ends of the bottom rail and projecting downwardly for engagement with a supporting surface, such as a floor. These adjustable feet 21 are mounted on and related to vertical alignment members 22 which are secured adjacent the lower vertical edges of the panel to permit adjacent panels to be properly vertically aligned. The relationship of feet 21 and alignment members 22 is disclosed in U.S. Pat. No. 3,990,204.

The upper edge of the panel 11 is defined by an elongated top cap 23 which extends longitudinally therealong, which top cap is of a downwardly opening channel-shaped configuration and is removably engaged with the top rail of the frame. End caps 24 are fixed to and extend vertically along the side edges of the panel, which end caps have (see FIG. 2) L-shaped hooks 26 projecting inwardly and engaged with the web of the side rail 14 for fixedly connecting same together. The end cap 24 has elongated slots 27 formed therein and opening sidewardly of the panel to accommodate therein, in a known manner, the mounting of brackets associated with auxiliary equipment which is to be mounted on the panel, which equipment may comprise file cabinets, book shelves and the like. End cap 24 also has a pair of elongated grooves 28 extending longitudinally thereof, with one of the grooves accommodating therein a hinge leaf associated with an elongated flexible striplike hinge member 29, which hinge member joins the end caps of a pair of adjacent panels so as to hingedly connect them together.

The upper corners of the panel are also provided with removable corner caps 31 which coact with the top cap 23 and the end cap 24 for forming a continuous cap structure which defines the exterior boundary of the panel.

Figure 3:
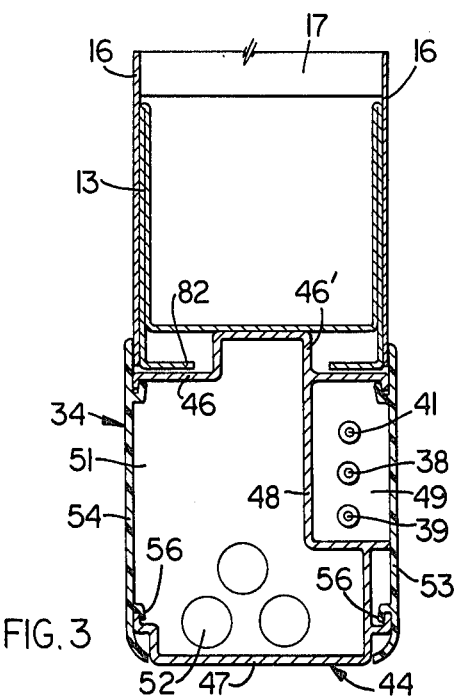
Figure 4:
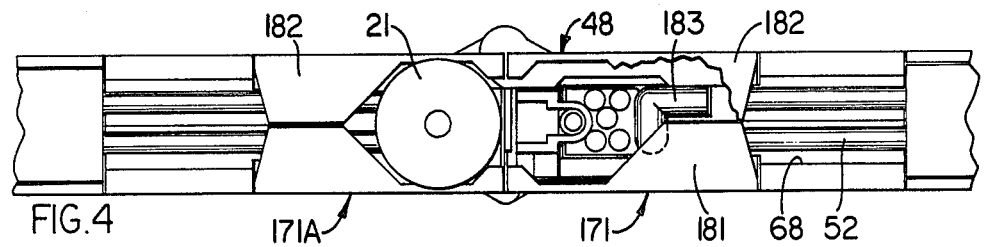
FIG. 4 is an enlarged fragmentary bottom view taken along line IV—IV in FIG. 1.
Figures 14, 16:
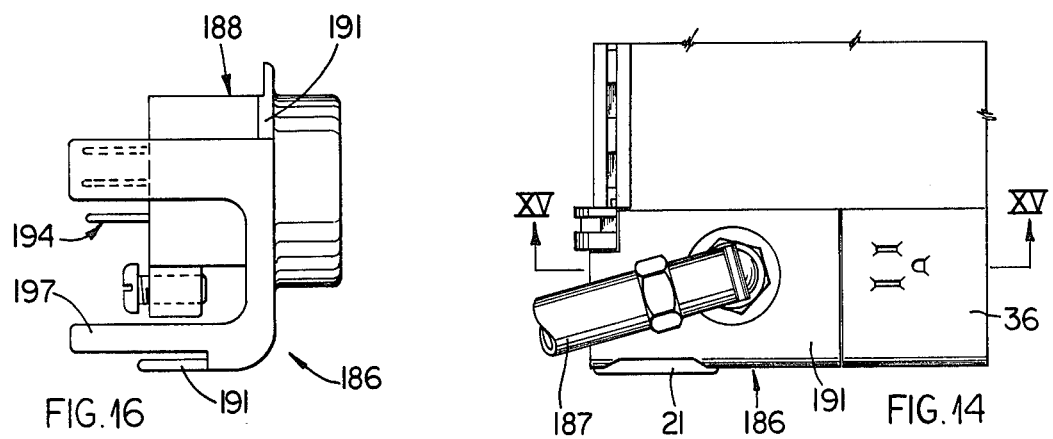
FIG. 14 is a fragmentary side elevational view showing a modification of the invention.
FIG. 16 is an end view of the power connector shown in FIG. 15.
Figure 15:
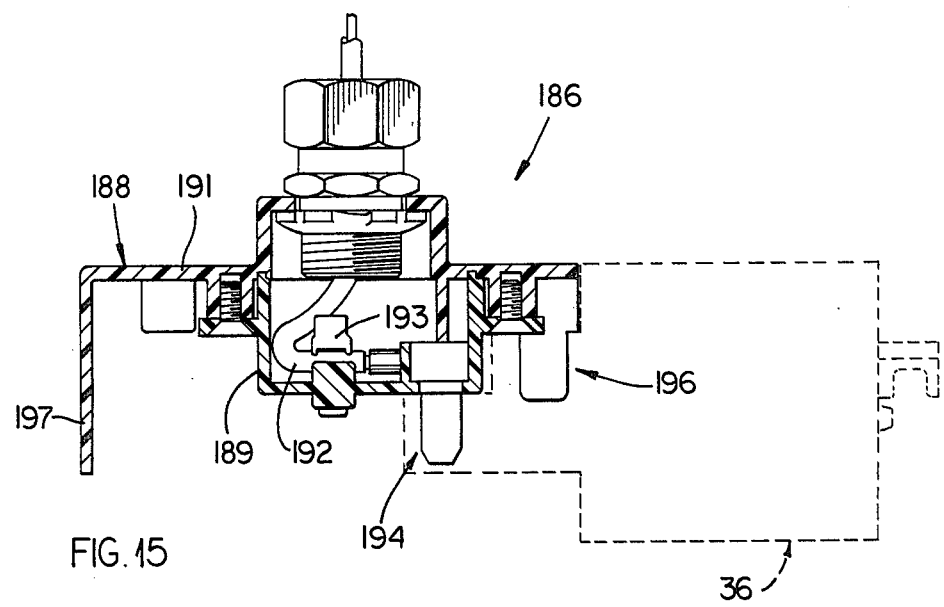
FIG. 15 is a fragmentary sectional view taken along line XV—XV in FIG. 14.
Figure 5:
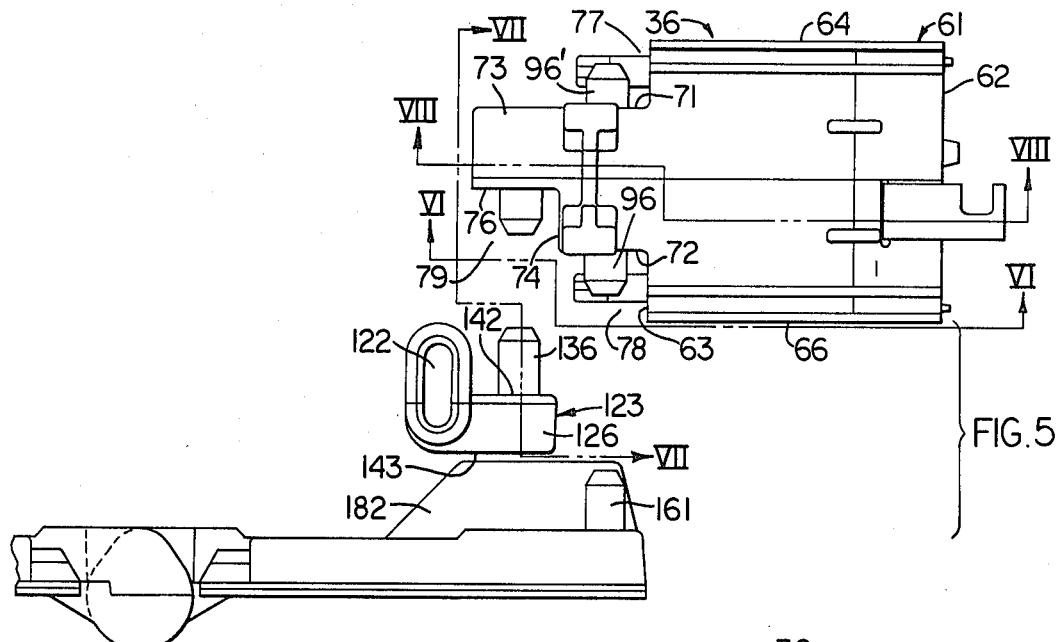
FIG. 5 is a top view of the power block, power connector and flexible connector shown in a separated condition.
Figures 6, 7:
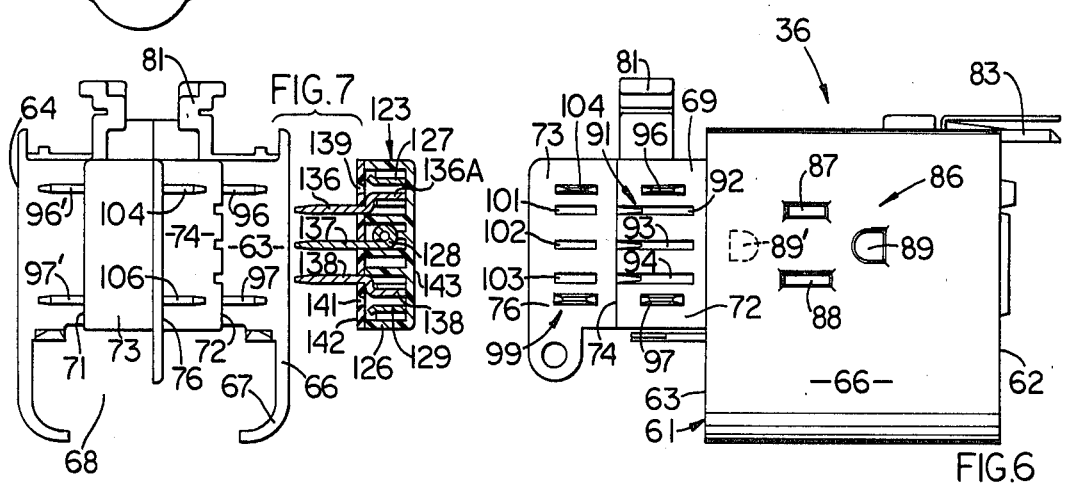
FIG. 6 is a side view of the power block taken along line VI—VI in FIG. 5.
FIG. 7 is an end view, partially in cross-section, taken along line VII—VII in FIG. 5.
Figure 9:
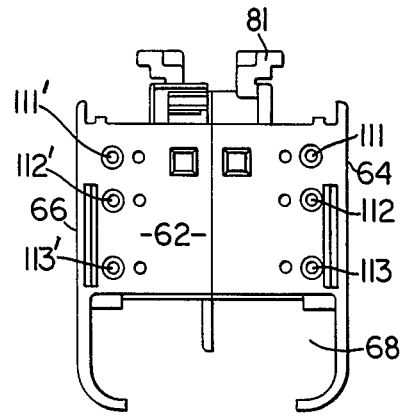
FIG. 9 is an end elevational view of the power block as taken from the right side of FIG. 6.

The panel 11 is provided with a prewired electrical system 33 associated therewith, which system includes an elongated raceway 34 fixed to the panel and extending longitudinally along the lower edge thereof. This raceway 34 terminates at identical power blocks 36 and 37 which are disposed adjacent the opposite lower corners of the panel. These power blocks 36 and 37 are electrically connected by suitable wires or cables which extend through the raceway 34, such as the power wires 38 and 39 and the ground wire 41 as shown in FIG. 3. The power block of one panel, such as the block 36 of the panel 11, is joined to the power block 37A of the adjacent panel 11A by a flexible electrical connector 42 to permit electrical energy to be transmitted between adjacent panels. Electrical energy is supplied to the panels from a suitable junction box, such as the junction box 43 which may be disposed in the ceiling as illustrated in FIG. 1, with electrical power being transmitted from the junction box downwardly to one of the power blocks by means of a suitable electrical connection which extends interiorly through the hollow rails which form the rigid rectangular frame of the panel.

The overall structure of the panel 11, and the general overall arrangement of the prewired electrical system 33 associated therewith, as illustrated and described in detail in co-pending application Ser. No. 615 506, filed Sept. 22, 1975.

Considering now the raceway 34 (FIG. 3), same comprises an elongated rail 44 having opposed top and bottom walls 46 and 47, respectively, joined together by an intermediate partition 48. The top wall has a projection 46' which is fixed to the web of the bottom rail 13. Partition 48 divides the raceway 34 into a pair of elongated interior channels 49 and 51. The channel 49 accommodates therein the electrical power cables which electrically connect the power blocks 36 and 37, whereas the other channel 51 is adapted to receive therein one or more communication cables 52, such as cables for telephone, Dictaphone, Telex or the like. The channels 49 and 51 are appropriately closed by a pair of removable side covers 53 and 54 which define the opposite sidewalls of the raceway and extend longitudinally therealong, which covers are substantially flush with the sidewalls of the panel. These covers 53 and 54 are identical and, in the illustrated embodiment, are formed from a plastics material whereby they are provided with a pair of resilient flanges 56 on the rearward side thereof which coact with appropriate ridges formed on the rail member 44 so that the individual covers can be removably supported on the rail, which resilient flanges create a snap-type fit with the rail member.

Referring now to FIGS. 5-9, the power block 36 (which is identical to the power block 37) includes a hollow box-like housing 61 having opposite and substantially parallel end walls 62 and 63 joined by substantially parallel sidewalls 64 and 66. The housing is preferably manufactured in two pieces, as by being molded from an electrically insulative material such as a plastics material, and has an exterior cross section which is compatible with the cross section of the raceway 34 so that the sidewalls 64 and 66 are substantially flush with the raceway covers 53 and 54.

The sidewalls 64 and 66 have lower portions 67 which define a downwardly opening recess 68 therebetween, which recess is aligned with the raceway channel 51 so that the communication cables can pass beneath the power block yet be hidden from view.

A first blocklike portion 69 is integral with the housing 61 and projects outwardly from the end wall 63, which portion 69 is defined between substantially parallel sidewalls 71 and 72. These latter-mentioned sidewalls 71 and 72 are substantially parallel to and spaced inwardly substantially equal distances from the sidewalls 64 and 66, respectively. A second blocklike portion 73 projects outwardly beyond the end wall 74 of the first blocklike portion 69. This second portion 73 has one sidewall thereof coplanar with the sidewall 71, whereas the blocklike portion 73 is defined by a further sidewall 76 which is parallel to but spaced inwardly from the sidewall 72. These blocklike portions 69 and 73 result in identical recesses 77 and 78 disposed on opposite corners of the power block, with a further recess 79 projecting inwardly from the bottom of the recess 78. This thus results in the end of the power block having a single steplike configuration on one side thereof, and a double steplike configuration on the other side thereof.

The power block includes a projection 81 which extends upwardly from the top wall of the housing and has sidewardly projecting lugs on the upper end thereof disposed for slidable engagement with flanges 82 (FIG. 3) which extend along the bottom rail 13 for mounting the power block thereon. This mounting of the power block is further accomplished by means of a projection 83 which extends outwardly beyond the end wall 62 and accommodates therein a suitable screw for permitting the housing 61 to be secured to the bottom rail 13.

Each of the sidewalls 64 and 66 has a socket-type receptacle 86 (FIG. 6) associated therewith for receiving either a conventional two or three-pronged plug. The receptacle 86 in sidewall 66 is defined by parallel slots 87 and 88 which are adapted to receive the power prongs of a plug, and opening 89 which is adapted to receive the grounded prong of the plug.

The socket 86 formed in the opposite sidewall 64 is of an identical configuration in that it also includes the parallel slots 87 and 88, which slots extend transversely across the complete width of the power block, and the opening 89' which is adapted to receive the grounded prong of the plug.

Each of the sidewalls 71 and 72 of the blocklike portion 69 also has a socket-type receptacle 91 (FIG. 6) associated therewith. The receptacle 91 formed in the sidewall 72 includes three elongated slots 92, 93 and 94 which are disposed in vertically spaced and parallel relationship. This receptacle 91 also has a pair of prongs 96 and 97 projecting perpendicularly outwardly from the sidewall 72, which prongs straddle the slots 92-94 and are constructed of an electrically conductive material.

The opposite sidewall 71 also has a socket-type receptacle 91 formed therein which is identical to the receptacle formed in the sidewall 72, inasmuch as the slots 92-94 extend transversely across the complete width of the blocklike portion 69. The prongs 96 which project outwardly from the sidewall 72, however, are insulated from the prongs 96' which project outwardly from the sidewall 71.

A further socketlike receptacle 99 (FIG. 6) is associated with the sidewall 76 of the second blocklike portion 73. This receptacle also includes three parallel vertically-spaced slots 101, 102 and 103 positioned between a pair of electrically conductive prongs 104 and 106 which project transversely outwardly from the sidewall 76.

The opposite sidewall of the second blocklike portion 73, which sidewall constitutes an extension of the sidewall 71, does not have a receptacle therein aligned with the above-mentioned receptacle 99. This blocklike portion 73 and the receptacle 99 formed therein is thus nonsymmetrical with respect to the longitudinally extending centerline of the power block 36, whereas the other receptacles 86 and 91 are provided in pairs which are disposed in alignment and substantially in symmetrical relationship with respect to the longitudinal direction of the power block.

Figure 8:
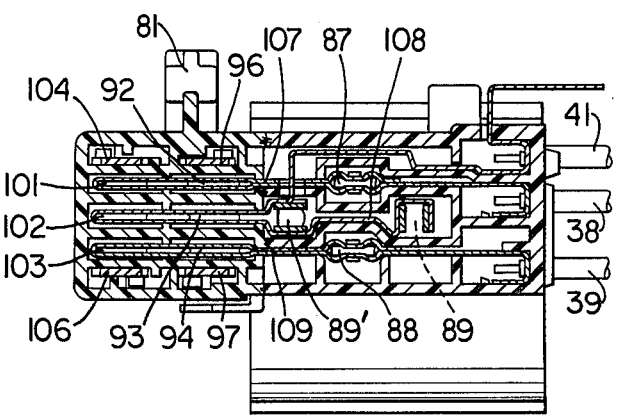
FIG. 8 is a sectional view taken along line VIII—VIII in FIG. 5.

The housing 61 (FIG. 8) contains three electrically conductive members 107, 108 and 109 disposed vertically one above the other, and individually formed from a copper plate which is suitably deformed to have the desired configuration. The conductive member 107 includes a pair of superimposed portions which are spaced apart so as to define the slots 87, 92 and 101 therebetween. The conductive member 109 is formed identical to the conductive member 107 and includes opposed portions which are suitably spaced apart to define the slots 88, 94 and 103 therebetween. The remaining conductive member 108 includes two laterally spaced portions which have opposed conductive parts and effectively define the openings 89 and 89' as shown in FIG. 8.

The conductive members 107-109 in power block 36 are respectively electrically connected to the corresponding conductive members provided in the power block 37 by the cables 38, 39 and 41 which extend through the raceway 34. For this purpose, the end of housing 61 is provided with a set of vertically spaced openings 111, 112 and 113 formed through the end wall 62 thereof, which openings are adjacent one side of the housing. A similar set of identical openings 111', and 112' and 113' are formed through the end wall adjacent the other side of the housing. One of these sets of openings is always aligned with the channel 49 whereby the cables 41, 38 and 39 individually project through these openings and are respectively electrically connected to the conductive members 108, 107 and 109.

To permit the power blocks associated with the wall structure to be energized, one of the power blocks is connected to an external power source. In the illustrated embodiment, the power block 36 is connected to an external power source in the form of the junction box 43 (FIG. 1) disposed in the ceiling, such as above the dropped ceiling 114. A connecting structure 116 extends downwardly from the junction box for connection to the power block 36. This connecting structure 116 includes an elongated rigid tubular element 117 which is fixed adjacent its upper end relative to the junction box and projects downwardly so as to be telescopically received within the interior of one of the side rails 14 associated with the panel 11. The panel 11 is provided with a special cap 31' at one corner thereof to permit the tubular element to project therethrough. The tubular element 117 has an interior partition 118 (FIG. 2) extending longitudinally thereof and dividing the element into two interior channels 119 and 121. The channel 119 accommodates therein a three-wire electrical conductor 122 which has its upper end connected to the junction box 43. The lower end of conductor 122 is provided with a power connector 123 (FIG. 1) in the form of a three-pronged plug which is adapted for engagement with the power block 36, as explained hereinafter.

The other channel 121 is adapted to accommodate therein a plurality of communication cables 52 which pass downwardly through the side rail of the panel and then bend outwardly so as to pass under the power blocks and through the associated raceways 34 and 34A. These communication cables 52 project upwardly through the upper end of the tubular element 117 for connection to an appropriate communication system or systems.

The plug-type power connector 123 (FIGS. 5 and 7) comprises a blocklike housing 126 constructed of an electrically insulative material, such as a plastics material. This housing has three electrical conductors 127, 128 and 129 disposed therein, which conductors are respectively electrically connected to the individual wires 131, 132 and 133 (FIG. 2) associated with the electrical conduit 122. The wire 132 constitutes the ground wire, so that the conductor 128 is also suitably grounded. The housing 126 also includes three electrically conductive prongs 136, 137 and 138 disposed in vertically spaced and parallel relationship, which prongs project perpendicularly from the sidewall 142 of housing 126.

The prong 137 is fixedly connected to the conductor 128 and thus constitutes a grounded element. The remaining prongs 136 and 138, however, respectively terminate in conductive portions 136A and 138A which are separated from the conductors 127 and 129, respectively, by means of intermediate gaps therebetween, which gaps are aligned with slots 139 and 141 formed in sidewall 142 and disposed so as to straddle the prongs 136–138. The prongs 136 and 138 are thus normally maintained in a de-energized condition, even though the conductors 127 and 129 are energized.

The power connector 123 is designed to fit within the recess 79 formed in the power block, with the connector being designed specifically for coaction with the receptacle 99. For this reason, the housing 126 is relatively thin and is defined between the opposed sidewalls 142 and 143, whereby the sidewall 142 substantially abuts the sidewall 76 when the connector is disposed within the recess 79 and engaged within the receptacle 99. The opposite sidewall 143 is disposed so that is does not project outwardly beyond the sidewall 72.

When the power connector 123 is inserted into the socket-type receptacle 99, the prongs 136, 137, 138 respectively enter into the slots 101, 102, 103. The grounded prong 137 thus engages the conductive member 108, whereas the power prongs 136 and 138 respectively engage the conductive members 107 and 109. Simultaneous with insertion of prongs 136–138 into slots 101–103, the conductive prongs 104 and 106 are respectively inserted into slots 139 and 141, which conductive prongs 104 and 106 cause the power prongs 136 and 138 to be respectively electrically connected to the energized conductors 127 and 129. Thus, the power prongs 136 and 138 do not become energized until the power connector is inserted into the power block, which in turn results in the simultaneous electrical energization of the power block. Further, the mere insertion of the prongs 136–138 into a three-pronged socket will not result in energization of the connector 123, inasmuch as the prongs of the connector 123 can be energized only by cooperation with the conductive prongs 104 and 106 provided on the power block 36. In this manner, all components are appropriately de-energized when disconnected, and energization can occur only when this power connector 123 and receptacle 99 are properly mated together.

Considering now the flexible electrical connector 42 (FIGS. 10–13), same includes a pair of elongated boxlike hollow housings 146 and 147 formed from an electrically insulative material, as by being molded from a plastics material. These housings have cooperating partially cylindrical hinge portions 148 and 149 which are disposed in relative rotational supporting engagement with one another for permitting the housings 146 and 147 to be swingably moved with respect to one another. The hinge axis defined by the hinge portions extends substantially vertically and is substantially aligned with the hinge axis defined by the flexible hinge member 29 which joins the two panels 11 and 11A together. Each of the housings 146 and 147 has an outer sidewall 151 which is vertically extended and has a configuration identical to the outer sidewalls of the power block housing so as to be compatible therewith, thereby forming a continuous and streamlined exterior appearance when mounted on the panel.

Electrical connector 42 has three flexible electrical wires 152, 153 and 154 positioned therein and extending through the hinge portions. The opposite ends of wire 152 are connected to electrical conductors 156 and 156A, the opposite ends of wire 153 are connected to electrical connectors 157 and 157A, and the opposite ends of wire 154 are joined to electrical conductors 158 and 158A. The sets of conductors 156–158 and 156A–158A are associated with identical three-pronged plugs 159 and 159A, respectively. These plugs 159 and 159A are designed for coaction with the power blocks 36 and 37A for electrically connecting the adjacent panels 11 and 11A.

The three-pronged plug 159 (FIG. 13) includes three electrically conductive prongs 161, 162 and 163 which extend transversely outwardly from the inner wall 164 of the housing 146. The upper prong 161 has the inner end thereof separated from the conductor 156 by an intermediate gap therebetween, which gap is aligned with a slot 166 formed in the inner wall 164. The middle prong 162 is integrally associated with the electrical conductor 157 and thus functions as the grounded prong of the plug. The lowermost prong 163 has its inner end separated from the conductor 158 by an intermediate gap therebetween, which gap is also aligned with a slot 167 formed in the sidewall 164.

Since the prongs 161 and 163 are isolated from the electrical conductors 156 and 158 respectively, these prongs remain de-energized so long as this gap exists, even though the electrical conductors 156 and 158 are energized. The set of prongs 161–163 are oriented so that they can be inserted into the set of slots 92–94 associated with the first blocklike portion 69 of the power block, whereby the prongs 161–163 when inserted respectively into the slots 92–94 are respectively electrically engaged with the electrical conductors 107–109. When the prongs 161–163 are inserted into the slots 92–94 of the power block, this results in the electrically conductive prongs 96 and 97 on the power block being respectively inserted into the slots 166 and 167 in the plug 159, whereby the prongs 161 and 163 are thus respectively electrically coupled with the electrical conductors 156 and 158. The prongs of the flexible electrical connector 42 can thus be energized only when these prongs are properly inserted into the power block since energization of the prongs 161 and 163 requires a mating coaction with the prongs 96-97 on the power block.

The three-pronged plug 159A associated with the other end of the flexible connector 42 is identical in construction and operation to the plug 159.

Since the prongs associated with the plugs 159 and 159A are normally maintained in a disconnected condition with respect to the electrical conductors disposed within the connector 42, even if one end of the connector 42 is plugged into a power box and is electrically energized, the prongs associated with the other end of the connector are still de-energized so long as this end is not plugged into as associated power box.

When the flexible connector 42 is used for electrically joining two adjacent panels as illustrated in FIG. 1, the connector is thus electrically and mechanically coupled to the power blocks 36 and 37A and thereby creates a smooth and substantially continuous sidewall along both of the panels, while at the same time enabling the adjacent panels to be angularly adjusted with respect to one another. However, the opposite sides of the panels in the vicinity of the power blocks 36 and 37A have similar recesses so that the flexible connector 42 can be mounted on either side of the panels depending upon the direction in which the panels are to be angularly oriented. To provide both sides of panels with a streamlined and smooth appearance, the present invention also provides dummy covers 171 and 171A (FIG. 11) which can be inserted into the nonused recesses of the power blocks so as to provide the panels with a continuous lower rail structure. These dummy covers 171 and 171A are positioned in the recesses of the panels which are disposed on the opposite sides from the electrical connector 42, substantially as illustrated in FIG. 11, with the dummy covers 171 and 171A being identical except for being mirror images of one another.

The dummy cover 171 is normally molded in one piece of a plastics material and includes an outer sidewall 173 which is identical to the sidewalls formed on the power block and the raceway 34 so as to provide a continuous sidewall extending along the complete lower edge of the panel. The cover 171 also has a pair of slotted projections 172 projecting inwardly from the sidewall 173, which projections 172 are positioned so as to receive therein the prongs 96 and 97 for mounting the dummy cover 171 onto the power block 36.

To assist in guiding the communication cables between the adjacent panels, the free end of dummy cover 171 has an end wall 174 which extends partially across the width of the panel and has an opening therethrough whereby this end wall permits the communication cables 52 to pass between the adjacent panels while providing a support for preventing these cables from drooping downwardly below the panels. The support of the communication cables is further facilitated by the provision of an inwardly directed bottom flange 181 which is provided on the lower edge of the sidewall 173 of the dummy cover, which flange 181 cooperates with a similar inwardly directed bottom flange 182 connected to the lower edge of the sidewall 151 of the flexible connector 42. These flanges 181 and 182 define a channel-like region or passage 183 thereabove, so as to accommodate the communication cables 52 and prevent them from drooping downwardly below the panel.

While the dummy covers 171 and 171A are illustrated in FIG. 11 as being used in conjunction with the flexible electrical connector 42 so as to fill the recesses at the lower corners of the panels and thereby give same the appearance of having continuous bottom rails, it will be appreciated that the dummy covers are equally applicable in those situations where the supplying of electrical energy along the wall structure is not necessary. In this situation, the flexible electrical connectors 42 are not utilized, so that the recesses on both sides of each lower corner of each panel are accordingly filled by utilizing dummy covers 171 and 171A. Further, the free edge of the endmost panel is preferably provided with dummy covers 171 and 171A at the lower corner thereof for closing off the recesses defined by the endmost power block. When two such dummy covers are disposed directly opposite one another, the end walls 174 thereof overlap. Since these end walls still define an opening therethrough, this opening is preferably closed by means of a small removable cover (not shown) which is preferably of a plastics material and can be snap-fitted into this opening.

While the wall structure illustrated and described above is connected to an external power source located adjacent the ceiling, such as the junction box 43 shown in FIG. 1, it will be appreciated that the wall system 10 can also be electrically energized by connecting same to a terminal box located either in the floor or in a sidewall. In this instance, the power is supplied directly to one of the power blocks by utilizing a power connector 186 of the type shown in FIGS. 13-16, which connector is joined to one end of the flexible conduit 187 having an electrical power cable disposed therein. The power connector comprises a housing 188 constructed of an electrically insulative material, which housing has a blocklike portion 189 which is adapted to be disposed within the recess 79 of the power block. This blocklike portion 189 also projects into the adjacent recess 78 of the power block. The housing 188 has an external sidewall 191 having a configuration identical to the sidewalls formed on the other components of the system, such as the power block, the raceway, the flexible electrical connector and the dummy cover, so that it gives the bottom rail of the panel a continuous and streamlined appearance. The three electrical cables 192 which are supplied to the power connector 186 from the external power source have their free ends suitably clamped within the connector, as by means of the clamp structure 193. These cables are connected to a three-pronged plug 194 which is structurally identical to the three-pronged plug formed on the power connector 123 so that the plug 194 can be inserted into the socket-type receptacle 99 formed on the power block 36. The power connector 186 also has the further three-pronged plug 196 associated therewith, which plug is designed for insertion into the socket-type receptacle 91 formed in the power block 36 so that the power connector 186 can thus be rigidly mounted on the power block due to the coaction of the two plugs 194 and 196 with the respective receptacles 99 and 91. The prongs of the plug 196, however, are all dummy prongs and are preferably of a nonconductive material since they are provided solely for assisting in mounting the power connector 186 onto the power block. The housing 188 also has an end wall 197 which is substantially identical to the end wall 174 formed on the dummy covers 171, for functioning in the same manner.

The assembly and operation of the wall structure incorporating the prefabricated panels or partitions of the present invention, and particularly the incorporation of the improved wiring system and components therefor as associated with the panels, is believed self-evident from the above description.

Thus, as is apparent from the above description, all of the desired electrical connections either between the panel and the main power source, or between the adjacent panels, can be easily and safely accomplished by means of a plug-and-socket connection which greatly facilitates the assembly and maintenance of the wall system. Further, the plug-and-socket connections are all of the de-energized type in that all of the exposed prongs are de-energized whenever the prongs are withdrawn from the respective sockets. The plugs can thus be energized, that is made "hot", only when they are inserted into the respective sockets. This thus provides for optimum safety of all personnel, including the maintenance personnel which disassemble and reassemble the wall systems, in that there is no need to worry about "hot" electrical components when in a disconnected state. This is achieved by providing each of the appropriate plugs and sockets with both male and female portions, whereby the male and female portions of a plug must respectively cooperate with the female and male portions of the associated socket prior to any of the male portions becoming electrically energized. For example, the socket-type receptacles 91 and 99 both include a female portion in the form of the three slots, and a male portion in the form of the two prongs which are always de-energized. The plug 159 associated with the flexible connector 42 includes a male portion formed by the three prongs and a female portion formed by the two slots, which prongs are de-energized at all times irrespective of the condition of the electrical conductors within the flexible conductor, so long as these prongs are not inserted into the socket 91. The plugs associated with the power connectors 123 and 186 are similarly constructed, having both male and female portions, with the male portions being de-energized so long as the plug is not inserted into the associated receptacle 99, even though the main power cables which are joined to the power connector 123 or 186 are nevertheless energized.

The wall panels incorporating the prewiring system of the present invention are normally considered to constitute furniture components inasmuch as the wall panels are prefabricated and, when assembled, form a free-standing wall used for dividing open office or work areas into smaller areas. The panels are normally covered with decorative coverings of plastic, fabric or carpeting so as to be esthetically attractive. In addition, other furniture components are often mounted on these panels, such as desks, filing cabinets and the like, so as to form a furniture system which is to be used to define a work area. While the electrical prewiring system of the present invention is particularly suitable for use on furniture components which are formed specifically as panels, as illustrated in the attached drawings and described in detail above, it will be appreciated that the electrical prewiring system of the present invention is also applicable to other prefabricated furniture components such as desks, filing cabinets and the like which could also be provided with power blocks and an associated two-channel raceway associated therewith for permitting electrical energy and/or communication cables to be readily supplied to the desired area.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows.

1. In a substantially free-standing interior wall system for dividing a large office area into smaller working areas, said wall system including a plurality of portable prefabricated upright panels, at least some of said panels being horizontally connected together in series so that the vertical end edges of said panels are positioned in close proximity to one another, and hinge means connected between the adjacent vertical end edges of adjacent panels for horizontally hingedly connecting said adjacent panels together to permit them to be horizontally angularly adjusted with respect to one another, the improvement comprising electrical power means formed as an integral part of said wall system for transmitting electrical energy to and between a group of said series-connected panels, said power means including:

first and second electrical terminal means fixedly mounted on each said panel of said group approximately adjacent the opposite end edges thereof in the vicinity of the lower corners of said panel, said electrical terminal means being disposed substantially between a pair of substantially parallel vertical planes as defined by the opposite side surfaces of the respective panel;

raceway means fixedly connected to each said panel of said plurality and extending horizontally across said panel adjacent the lower edge thereof, said first and second terminal means being positioned adjacent the opposite ends of said raceway means, said raceway means extending across and having a width which approximately corresponds to the width of said panel, said raceway means including wall means defining a substantially closed interior passageway which extends horizontally of said panel between said first and second electrical terminal means for permitting communication cables or the like to pass therethrough:

cable means extending horizontally across each said panel, the opposite ends of said cable means being fixedly connected to said first and second electrical terminal means for permitting transmission of electrical energy therebetween;

each said terminal means having a pair of multiconductor connection means integrally associated therewith, the pair of connection means on said first terminal means being identical to the pair of connection means on said second terminal means, each said connection means defining one-half of a separable electrical connection, said pair of connection means as associated with each said terminal means being sidewardly spaced apart in the widthwise dimension of the panel but spaced laterally inwardly from the exterior sidewalls of said raceway means, whereby one connection means of said pair is positioned more closely adjacent one of the side surfaces of the panel and the other connection means of said pair is positioned more closely adjacent the other side surface of the panel;

flexible electrical connector means extending between and connected to the opposed pair of electrical terminal means as provided on first and second said panels which are disposed adjacent and horizontally series-connected for transmitting electrical energy between said first and second panels, said flexible electrical connector means including a pair of housing parts each having connecting means associated therewith and joined together by a center portion which permits said pair of housing parts to be horizontally angularly displaced relative to one another so as to accommodate the horizontal angular relationship between the series-connected first and second panels, each said connecting means being incompatible and not engageable with a conventional two- or three-conductor plug or socket, said flexible electrical connector means also including electrical conductor means extending through said center portion for electrically joining said pair of connecting means together, each of said connecting means defining one-half of said separable electrical connection and being slidably engageable with one of said connection means as associated with each electrical terminal means of said opposed pair, and said housing parts being disposed so as to not extend laterally outwardly of said raceway means when said connecting means and said connection means are joined together;

said flexible connector means being disposed substantially between or flush with parallel vertical planes as defined by the opposed sides of said first and second panels, one of said connecting means being slidably engaged with the connection means disposed adjacent said one side of said wall system and as associated with the electrical terminal means mounted on said first panel in close proximity to said second panel, the other said connecting means being slidably engageable with the connection means as disposed more closely adjacent said one side of said wall system and as associated with the electrical terminal means of said second panel as disposed in close proximity to said first panel, whereby said first and second panels are electrically joined together;

said flexible electrical connector means being electrically connectible between said opposed pair of terminal means by being alternatively releasably joined to either (1) the opposed pair of connection means as disposed more closely adjacent said one side of said wall system, or (2) the other opposed pair of connection means as disposed more closely adjacent the other side of said wall system, but not to both at the same time, whereby said flexible electrical connector means can be electrically connected between the opposed pair of electrical terminal means by being positioned adjacent either side of said wall system but not on both sides at the same time so as to permit any desired alignment or angularity between the series-connected panels;

one said electrical terminal means as associated with each panel also including a further connection means associated therewith for defining one-half of a plug-in type separable electrical connection, said further connection means being positioned in close proximity to and approximately between said pair of first-mentioned connection means, and elongated electrical cable means projecting vertically downwardly through an interior passageway in one of said panels and terminating at its lower end in another connection means defining one-half of said last-mentioned electrical connection, said another connection means being slidably engageable with said further connection means.

2. A wall system according to claim 1, wherein at least one of said electrical terminal means as associated with some of said panels has a conventional two- or three-conductor electrical socket opening sidewardly through one of the side surfaces of the respective panel for accommodating a conventional two- or three-prong electrical plug, and each said connecting means and connection means being structurally and functionally different from and not engageable with a conventional two- or three-conductor electrical socket or plug.

3. A wall system according to claim 2, wherein said raceway means includes a pair of side cover plates which extend longitudinally of the respective panel and are disposed within planes substantially coplanar with the side surfaces of the panel, said pair of cover plates being individually movable sidewardly relative to the respective panel into an open position for providing convenient access to the interior of said raceway means.

4. A wall system according to claim 2, wherein one of the opposed pair of terminal means has a second identical said flexible electrical connector means slidably engaged with the other connection means which is not engaged by said first-mentioned flexible electrical connector means, whereby the second flexible electrical connector means can be joined to a third panel.

5. In an interior wall system for dividing a large area into smaller working areas, said system including a plurality of portable upright panels horizontally serially connected so that vertical ends of said panels are positioned in close proximity to one another, and electrical power means formed as an integral part of said wall system for transmitting electrical energy to and between at least some of the serially connected panels, the improvement wherein said power means comprises:

first and second substantially identical electrical power blocks fixedly mounted on each said panel of said plurality approximately adjacent the opposite vertical ends thereof, said electrical power blocks being disposed substantially between a pair of substantially parallel vertical planes as defined by the opposite sides of the respective panel;

cable means extending between and connected to said first and second electrical power blocks for permitting transmission of electrical energy therebetween;

each said power block having identical first and second connection means integrally associated therewith, the two said connection means on said first power block being identical to the two said connection means on said second power block, each said first and second connection means defining one half of a separable electrical connection, said two connection means as associated with each said power block being spaced inwardly from the sides of its respective panel;

electrical connector means extending between and connected to an opposed pair of said electrical power blocks as provided on first and second said panels which are disposed adjacent and horizontally serially connected for transmitting electrical energy between said first and second panels, said electrical connector means including a pair of substantially identical third connection means joined together by a center portion which permits said pair of third connection means to be horizontally angularly displaced relative to one another to accommodate the horizontal angular relationship between the serially-connected first and second panels, said third connection means defining one half of said separable electrical connection and being alternatively releasably engageable with either one of said first and second connection means;

said connector means, when joined to said opposed pair of power blocks, being disposed substantially between, or flush with parallel vertical planes as defined by the opposed sides of said first and second panels;

one of said third connection means being releasably engaged with the first connection means associated with one of the electrical power blocks of said opposed pair as mounted on said first panel, the other said third connection means being releasably engageable with the first connection means associated with the other electrical power block of said opposed pair as mounted on said second panel, whereby said first and second panels are electrically joined together; and said electrical connector means being electrically connectible between said opposed pair of electrical power blocks by being alternatively releasably joined to either the opposed pair of first connection means or the opposed pair of second connection means, but not to both at the same time.

6. A wall system according to claim 5, wherein each of said first, second and third connection means is different from and not engageable with a conventional three-prong electrical plug or three-hole electrical receptacle.

7. A wall system according to claim 6, wherein the panel includes raceway means fixed thereto and extending horizontally thereof along a lower edge, said first and second electrical power blocks being mounted on said panel adjacent the opposite ends of said raceway means in the vicinity of the lower panel corner, said raceway defining therein an interior passage for permitting extension therethrough of communication cables or the like.

8. A wall system according to claim 7, wherein said raceway means includes a pair of side cover plates which extend longitudinally of the respective panel and are disposed within planes substantially coplanar with the side surfaces of the panel, said pair of cover plates being individually movable sidewardly relative to the respective panel into an open position for providing convenient access to the interior of said raceway means.

9. A wall system according to claim 6, including elongated cablelike power supply means for supplying electrical energy to said series-connected panels from an external power source, said supply means having one end thereof connected to said external power source, said supply means having one half of a separable electrical connector thereon which is removably connected to one of said electrical power blocks of said opposed air by means of a plug-in type connection for supplying electrical energy thereto.

10. A wall system according to claim 9, wherein one of said panels has means defining an interior passage projecting vertically downwardly through the interior of said panel adjacent one vertical end edge thereof, said power source being located adjacent the ceiling, and said supply means projecting vertically downwardly from said power source and through said interior passage for connection with the electrical power block which is mounted on the respective panel adjacent the respective end edge.

11. A wall system according to claim 6, wherein at least one of said electrical power blocks as associated with some of said panels has socket means fixedly connected thereto and opening sidewardly through one of the side surfaces of the respective panel for accommodating a conventional two- or three-prong electrical plug.

12. A wall system according to claim 6, wherein the separable electrical connection is of the plug-in type.

13. In an upright interior wall structure formed from a plurality of portable upright partitions adapted to be joined together so that the vertical edges thereof are adjacent one another with the partitions being at any desired horizontal angular orientation relative to each other, the improvement comprising:

raceway means fixed to a horizontally extending edge of each upright partition and extending longitudinally therealong, said raceway means including spaced and substantially parallel vertical surfaces defining therebetween longitudinally extending interior passageway means;

a pair of electrical power block means fixedly mounted on each of said partitions, each of said electrical power block means of said pair being disposed adjacent a respective end of said raceway means, each said electrical power block means being disposed so as not to extend laterally outwardly of said raceway means, each said power block means also having a pair of identical first electrical connections portions facing toward the opposite sides of the partition;

electrical cable means disposed within and extending through said interior passageway means and connected to said pair of electrical power block means for transmitting electrical energy therebetween;

an electrical connecting device electrically connecting a first said power block means disposed adjacent a first vertical edge of a first partition to a second said power block means disposed adjacent a second vertical edge of a second partition when said first and second partitions are disposed with said first and second vertical edges closely adjacent one another, said electrical connecting device including means which permits it to angularly adjust to the desired horizontal angular orientation between the joined partitions;

said electrical connecting device further including two housing parts joined by an intermediate hinge, the two housing parts having identical second electrical connector portions associated therewith and releasably engageable with the first connector portions, said two housing parts being disposed so as to not extend laterally outwardly of said raceway means when engaged with said first and second power block means;

said electrical connecting device being electrically connectible between said first and second power block means by being alternatively releasably joined to either (1) the opposed pair of first connector portions which face toward one side of the wall structure, or (2) the other opposed pair of first connector portions which face toward the other side of said wall structure, but not to both at the same time.

14. A wall structure according to claim 13, wherein said raceway means includes a pair of side covers which extend longitudinally of the respective partition and are disposed within planes which are substantially coplanar with the side surfaces of the partition, said pair of side covers being individually movable sidewardly relative to the respective partition into an open position for providing convenient access to the interior of said raceway means, said side covers being positioned so that the housing parts associated with said electrical connecting device do not project laterally outwardly beyond the exterior surfaces of the side covers.

15. A wall structure according to claim 13, wherein each housing part as associated with the electrical connecting device is relatively stiff and extends inwardly from an end of said electrical connecting device with said two housing parts being joined together by an intermediate hinge structure, said two housing parts having substantially planar exterior vertical surfaces, and the second connector portions as associated with said housing parts each extending perpendicularly inwardly relative to the respective housing part so as to be slidably engageable with a respective first connector portion by being pushed inwardly in a direction substantially perpendicular to the planar side of the respective panel, the two second connector portions both projecting sidewardly in substantially the same direction and in substantially parallel relationship when the electrical connecting device is in a straight or non-angled condition.

16. In an upright wall structure formed from a plurality of portable upright partitions which are joined together so that the vertical edges thereof are adjacent one another, the improvement comprising:

raceway means fixed to a horizontally extending edge of each upright partition and extending longitudinally therealong, said raceway means defining therein a longitudinally extending interior passageway, said raceway means also extending substantially across the width of said partition and being defined between a pair of openable side covers disposed adjacent the opposite sides of the partition;

a pair of electrical power block means fixedly mounted on each of said partitions, said pair of power block means being disposed adjacent the opposite ends of said raceway means in the vicinity of the opposite vertical edges of said partition;

electrical cable means disposed within and extending through said raceway means and connected to the power block means as disposed adjacent the opposite end of said raceway means for transmitting electrical energy therebetween;

an electrical connecting device for electrically connecting a first said power block means as disposed adjacent a first vertical edge of a first partition to a second said power block means as disposed adjacent a second vertical edge of a second partition when said first and second partitions are disposed with said first and second vertical edges closely adjacent one another, said electrical connecting device including intermediate means which permits it to angularly adjust to the desired horizontal angular orientation between the joined partitions;

a first plug-in electrical connector coacting between said electrical connecting device and said first power block means for electrically connecting same together, and a second plug-in electrical connector coacting between said electrical connecting device and said second power block means for electrically connecting same together, each of said first and second plug-in electrical connectors being identical and formed by two separable mating portions;

each said power block means of said first and second partitions having an identical pair of identical first said mating portions associated therewith, and said electrical connecting device having an identical pair of second said mating portions each engageable with one of said first mating portions and spaced apart by said intermediate means;

said power block means including a housing positioned substantially centrally of the partition when viewed in the width-wise dimension thereof, said housing having a pair of oppositely facing sidewalls which are each spaced laterally inwardly from the respectively adjacent side cover so as to define an open region between a plane defined by the exterior side surface of the adjacent side cover and the adjacent sidewall, each sidewall of said pair having a said first mating portion associated therewith and accessible from the respective open region;

said electrical connecting device including two housing parts joined together by said intermediate means, each said housing part having a said second mating portion associated therewith and each being positionable within said open region so that said housing part does not project laterally outwardly of said plane; and said electrical connecting device being alternatively positionable adjacent either side of said joined partitions so that the housing parts thereof are within the adjacent open regions located on either one side or the other side, but not both, of said joined partitions.

17. In an upright space divider system having a plurality of interconnected portable upright partitions which are serially joined together so that the vertical edges thereof are adjacent one another, the improvement comprising:

means fixedly associated with selected ones of said partitions and defining an elongated channel-like space which extends longitudinally of the respective partition adjacent the lower edge thereof, said space being disposed between a pair of substantially parallel vertical planes which effectively define the opposite side surfaces of the respective partition, and a removable side cover associated with at least one side of said means for permitting access to said elongated space;

a pair of substantially identical electrical power block means fixedly mounted on selected ones of said partitions, said pair of power block means being mouned on the respective partition adjacent the opposite ends of the respective space and being disposed substantially between said two vertical planes, each said power block means having identical first and second socket-like means associated therewith and disposed within the region defined between said two vertical planes;

flexible electrical connector means extending between two of said selected partitions for electrically joining a first said power block means of a first selected partition to a second said power block means of a second selected partition to enable said first and second partitions to be relatively horizontally angularly moved while being electrically interconnected, said flexible electrical connector means including a first housing part having first electrical plug-like means adapted for engagement with one of the socket-like means associated with the first power block means and a second housing part having second electrical plug-like means adapted for engagement with one of the socket-like means of the second power block means, said flexible connector means when joined between said first and second power block means being engaged solely with said one socket-like means as associated with each said power block means, and said flexible electrical connector means being positioned adjacent the lower edges of said partitions and disposed so as to lie substantially within the vertical boundaries of said partitions; and electrical cable means for supplying electrical energy to one of said first and second power block means from a remote power source, said electrical cable means extending vertically downwardly through the interior of one of said partitions and terminating in a plug-like connector engageable with the other socket-like means of one of said first and second power block means, said plug-like connector being disposed between said planes.

18. In a portable prefabricated wall panel having means defining an elongated passageway disposed interiorly of the panel adjacent one edge thereof, and electrical cable means disposed within said passageway and extending longitudinally therethrough, the improvement comprising:

a pair of substantially identical electrical power block means fixedly mounted on said panel adjacent the opposite vertical edges thereof, said power block means being mounted on said panel adjacent the opposite ends of said passageway, and said electrical cable means being connected to and between said pair of power block means;

said power block means comprising a housing constructed of an electrically insulative material and a plurality of electrically conductive elements mounted within said housing and insulated from one another, said electrically conductive elements being electrically connected to said electrical cable means;

each said power block means including first electrical receptacle means for permitting said power block to be electrically connected to a substantially identical power block means of a further panel, said first receptacle means including a first set of openings formed in a wall of said housing and cooperating with said electrically conductive elements;

each said first receptacle means also including a pair of electrically conductive prongs disposed adjacent the first set of openings and projecting outwardly from the sidewall of the housing, said first pair of electrically conductive prongs being electrically isolated from the electrically conductive elements; and each said power block means including second electrical receptacle means associated therewith for permitting connection to an external power source, said second receptacle means including a second set of openings formed in a wall of said housing and cooperating with said electrically conductive elements.

19. A wall panel according to claim 28, wherein each of said first and second receptacle means has a pair of said electrically conductive prongs associated therewith.

20. A wall panel according to claim 18, including electrical connector means for electrically connecting together a first said power block means of one panel with a second said power block means as associated with a further panel, said electrical connector means including first and second substantially indentical plug means adapted for engagement with the first receptacle means as associated with the first and second power block means respectively, each of said plug means including a set of electrically conductive prongs adapted to be inserted into said first set of openings, said electrical connector means also including electrical conductor means extending between the prongs of said first and second plug means, at least some of the prongs of said first and second plug means being normally isolated from said electrical conductor means, each said plug means having a slot means associated therewith for isolating the latter-mentioned prongs from said electrical conductor means, and the prongs associated with said first receptacle means comprising dummy prongs disposed adjacent said first set of openings and constructed of an electrically conductive material so that said dummy prongs are inserted into said slot means simultaneous with the insertion of the electrically conductive prongs of said plug means into said first set of openings so that said electrically conductive prongs are electrically connected to said electrical conductor means.

21. A wall panel according to claim 18, wherein each said power block means includes third electrical receptacle means for receiving a conventional two- or three-pronged plug, and wherein said first receptacle means includes two identical receptacles disposed on opposite sides of said housing, the configuration of the receptacles defined by said first and third receptacle means being different so as to accommodate different types of plugs.

22. In a wall structure formed from a plurality of portable prefabricated partitions, and securing means for joining the adjacent vertical edges of said partitions together, the improvement comprising:

raceway means fixed to each partition and extending longitudinally therealong, said raceway means defining a longitudinally extending interior passageway;

a pair of electrical power block means fixedly mounted on each of said partitions, said pair of power block means being disposed adjacent the opposite ends of said raceway means and adjacent the opposite vertical edges of said partitions;

electrical cable means disposed within and extending through said interior passageway and connected to the power block means as disposed adjacent the opposite ends of said raceway means for transmitting electrical energy therebetween;

electrical connector means for electrically connecting a first said power block means as disposed adjacent a first vertical edge of a first partition to a second said power block means as disposed adjacent a second vertical edge of a second partition when said first and second partitions are disposed closely adjacent one another and are connected together by said securing means, said electrical connector means being disposed substantially between the vertical planes defining the opposite sides of the wall structure;

said electrical connector means including an electrically insulative housing having first and second parts and electrically conductive means disposed within said housing and extending between said first and second parts;

cooperating means associated with said power block means and said electrical connector means for releasably electrically connecting same together, said cooperating means including first means associated with each of said first and second parts and second means associated with each of said power block means, said first and second means forming a releasable plug-in connection between said electrical connector means and each of said first and second power block means;

each of said first and second means including male and female portions, whereby the male and female portions of said first means respectively engage the female and male portions of said second means;

the male portion of said first means comprising a plurality of first prongs which are of an electrically conductive material, at least some of said first prongs being separated and electrically isolated from the electrically conductive means by intermediate gaps, the female portion of said first means comprising first openings formed in the housing of said electrical connector means and communicating with said gaps; and the female portion of said second means comprising second openings formed in the housing of said power block means and associated with electrically conductive elements disposed within said housing, and the male portion of said second means comprising a plurality of second prongs which are also of an electrically conductive material, said second prongs being isolated from the electrically conductive elements within the housing of said power block means, said second prongs being insertable into the gaps associated with said first means for bridging these gaps to thereby electrically energize the first prongs when they are inserted into said second openings.

23. A wall structure according to claim 22, wherein each said power block means has first electrical socket means formed therein for reception of a conventional two- or three-pronged plug, and wherein each said power block means includes second electrical socket means disposed therein, said second socket means having a configuration different from said first socket means, said second socket means being adapted for connection to the plug of a power supply device which is connected to an external power source.

24. In a portable prefabricated wall panel, the improvement comprising:

elongated tubular raceway means fixed to said panel and extending longitudinally along an edge thereof, said raceway means defining an interior passageway extending therethrough;

a pair of electrical power block means fixedly mounted on said panel adjacent the opposite vertical edges thereof, said power block means being mounted on said panel adjacent the opposite ends of said passageway, each of said power block means comprising a housing constructed of an electrically insulative material having a plurality of electrically conductive elements mounted therein;

electrical cable means disposed within said passageway and extending longitudinally therethrough, said electrical cable means having the opposite ends thereof electrically connected to the electrically conductive elements mounted within said pair of power block means;

at least one of said power block means having electrical socket means associated therewith for accommodating a conventional two- or three-pronged plug;

electrical input means for supplying electrical energy to a selected one of said power block means from an external source, said electrical input means including an elongated tubular element extending between said source and said panel and having a multi-wire electrically conductive cable disposed therein, said cable terminating in a power connector adapted for releasable connection to said selected one power block means;

said selected one power block means and said power connector respectively having first and second cooperative means for forming a releasable plug-in electrical connection between said selected one power block means and said power connector;

said first cooperative means including first male and female portions, said second cooperative means including second male and female portions respectively disposed for engagement with said first female and male portions when the first and second cooperative means are joined together, the first and second male portions each being electrically de-energized whenever the power connector is disconnected from said selected one power block means;

said second male portion as associated with said power connector including a plurality of outwardly projecting prongs constructed of an electrically conductive material, at least some of said prongs being permanently separated from said multi-wire cable by appropriate gaps therebetween, and said first male portion as associated with said selected one power block means including plural prongs constructed of an electrically conductive material and disposed so as to be inserted into said gaps for bridging same, said last-mentioned prongs being electrically isolated from the electrically conductive elements disposed within said selected one power block means.

25. A wall panel according to claim 24, wherein said pair of power block means are identical, and wherein each said power block means includes second electrical socket means associated therewith, said second socket means including a pair of identical sockets each having a set of openings disposed for cooperation with the electrically conductive elements disposed within said housing, the sockets of said second socket means having a configuration which is different from said first-mentioned socket means so as to accommodate a different type of plug.

26. A wall panel according to claim 25, wherein said power connector includes a cover portion which is positioned adjacent and substantially aligned with the sidewall of said power block means and said panel, said power connector also having means associated therewith and disposed in engagement with one of the sockets of said second socket means for mounting said power connector on said panel.

27. In a portable prefabricated wall panel, the improvement comprising:

elongated tubular raceway means fixed to said panel and extending longitudinally along an edge thereof, said raceway means defining an interior passageway extending therethrough;

a pair of electrical power block means fixedly mounted on said panel adjacent the opposite vertical edges thereof, said power block means being mounted on said panel adjacent the opposite ends of said passageway, each of said power block means comprising a housing constructed of an electrically insulative material having a plurality of electrically conductive elements mounted therein;

electrical cable means disposed within said passageway and extending longitudinally therethrough, said electrical cable means having the opposite ends thereof electrically connected to the electrically conductive elements mounted within said pair of power block means;

at least one of said power block means having electrical socket means associated therewith for accommodating a conventional two- or three-pronged plug, said socket means including a set of openings formed in said housing and cooperating with the electrically conductive elements;

electrical input means for supplying electrical energy to a selected one of said power block means from an external source, said electrical input means including an elongated tubular element extending between said source and said panel and having a multi-wire electrically conductive cable disposed therein, said cable terminating in a power connector adapted for releasable connection to said selected one power block means;

said selected one power block means and said power connector respectively having first and second cooperative means for forming a releasable plug-and-socket electrical connection between said selected one power block means and said power connector;

said first cooperative means including first male and female portions, said second cooperative means including second male and female portions respectively disposed for engagement with said first female and male portions when the first and second cooperative means are joined together, the first and second male portions each being electrically de-energized whenever the power connector is disconnected from said selected one power block means;

said raceway means extending along said panel adjacent the lower edge thereof, said panel including a rigid rectangular frame defined by elongated rail members which define a hollow interior passage therealong, said external power source being disposed above the wall panel and said tubular element extending vertically downwardly so as to be telescopically slidably received within the hollow passage defined by one of the side rail members of said frame, said power connector being disposed centrally of the panel adjacent one end of said power block means, and a pair of removable cover means positioned adjacent the opposite sides of said panel for enclosing said power connector therebetween.

28. A wall panel according to claim 27, wherein each said power block means includes second electrical socket means associated therewith, said second socket means including a pair of identical sockets each having a set of openings disposed for cooperation with the electrically conductive elements disposed within said housing, the sockets of said second socket means having a configuration which is different from said first socket means, and a removable cover positioned adjacent at least one side of said panel for at least partially covering a respective one of said power block means, said removable cover having means associated therewith and disposed in engagement with said second socket means for fixedly mounting said cover on said one power block means.

29. In an interior wall system for dividing a large area into smaller working areas, said system including a plurality of portable upright panels horizontally serially-connected so that vertical ends of said panels are positioned in close proximity to one another, and electrical power means formed as an integral part of said wall system for transmitting electrical energy to and between at least some of the serially-connected panels, the improvement wherein said power means comprises:

first and second electrical power block means fixedly mounted on each said panel of said plurality approximately adjacent the opposite vertical ends thereof, said electrical power block means being disposed substantially between a pair of substantially parallel vertical planes as defined by the opposite sides of the respective panel;

cable means extending between and connected to said first and second electrical power block means for permitting transmission of electrical energy therebetween;

said first power block means having first and second multiconductor electrical connectors integrally associated therewith, said second power block means having first and second multiconductor electrical connectors integrally associated therewith and being respectively identical to said first and second connectors on said first power block means, each of said connectors defining one-half of a separable electrical connection, the said two connectors as associated with each of said first and second power block means being spaced inwardly from the sides of the respective panel;

electrical connector means extending between and connected to an opposed pair of said electrical power block means as provided on first and second said panels which are disposed adjacent and horizontally serially-connected for transmitting electrical energy between said first and second panels, said opposed pair of power block means including the first power block means as mounted on said first panel and the second power block means as mounted on said second panel;

said electrical connector means including third and fourth multiconductor electrical connectors joined together by a center portion which permits said third and fourth connectors to be horizontally angularly displaced relative to one another to accommodate the horizontal angular relationship between the serially-connected first and second panels, each of said third and fourth connectors defining one-half of said separable electrical connection and each being alternately releasably engageable with either said first power block means or said second power block means but not engageable with both at the same time;

each said separable electrical connection, as defined by the cooperation of two said connectors, being incompatible and not engageable with a conventional two- or three-conductor plug or socket;

said electrical connector means, when joined to said opposed pair of power block means, being disposed substantially between, or flush with, parallel vertical planes substantially as defined by the opposed sides of said first and second panels;

said third connector as associated with said electrical connector means being releasably slidably engageable with either the first connector on said first panel, or the first connector on said second panel, but not with both at the same time;

said fourth connector as associated with said electrical connector means being releasably slidably engageable with either the second connector on said second panel, or the second connector on said first panel, but not with both at the same time;

said electrical connector means being electrically connectibly joined between said opposed pair of power block means either by being joined to the first and second connectors on said first and second panels respectively, or by being joined to the first and second connectors on said second and first panels respectively, but not to both at the same time, and one of the power block means of said opposed pair having a second identical said electrical connector means releasably electrically joined thereto so that a third said panel can be disposed with an end edge thereof in the vicinity of the adjacent end edges of said first and second panels with said third panel being electrically connected to said first and second panels, said second electrical connector means being joined to the remaining said connector as associated with the selected power block and being disposed substantially between or flush with the opposed sides of the joined panels; and some of said power block means also having at least one conventional two- or three-conductor electrical socket associated therewith and opening sidewardly of the respective panel.

30. In an interior wall system for dividing a large area into smaller working areas, said system including a plurality of portable upright panels horizontally serially-connected so that vertical ends of said panels are positioned in close proximity to one another, and electrical power means formed as an integral part of said wall system for transmitting electrical energy to and between at least some of the serially-connected panels, the improvement wherein said power means comprises:

first and second electrical power block means fixedly mounted on each said panel of said plurality approximately adjacent the opposite vertical ends thereof, said electrical power block means being disposed substantially between a pair of substantially parallel vertical planes as defined by the opposite sides of the respective panel;

cable means extending between and connected to said first and second electrical power block means for permitting transmission of electrical energy therebetween;

said first power block means having first and second multiconductor electrical connectors integrally associated therewith, said second power block means having first and second multiconductor electrical connectors integrally associated therewith and being respectively identical to said first and second connectors on said first power block means, each of said connectors defining one-half of a separable electrical connection, the said two connectors as associated with each of said first and second power block means being spaced inwardly from the sides of the respective panel;

electrical connector means extending between and connected to an opposed pair of said electrical power block means as provided on first and second said panels which are disposed adjacent and horizontally serially-connected for transmitting electrical energy between said first and second panels, said opposed pair of power block means including the first power block means as mounted on said first panel and the second power block means as mounted on said second panel;

said electrical connector means including third and fourth multiconductor electrical connectors joined together by a center portion which permits said third and fourth connectors to be horizontally angularly displaced relative to one another to accommodate the horizontal angular relationship between the serially-connected first and second panels, each of said third and fourth connectors defining one-half of said separable electrical connection and each being alternately releasably engageable with either said first power block means or said second power block means but not engageable with both at the same time;

each said separable electrical connection, as defined by the cooperation of two said connectors, being incompatible and not engageable with a conventional two- or three-conductor plug or socket;

said electrical connector means, when joined to said opposed pair of power block means, being disposed substantially between, or flush with, parallel vertical planes substantially as defined by the opposed sides of said first and second panels;

said third connector as associated with said electrical connector means being releasably slidably engageable with either the first connector on said first panel, or the first connector on said second panel, but not with both at the same time;

said fourth connector as associated with said electrical connector means being releasably slidably engageable with either the second connector on said second panel, or the second connector on said first panel, but not with both at the same time;

said electrical connector means being electrically connectibly joined between said opposed pair of power block means either by being joined to the first and second connectors on said first and second panels respectively, or by being joined to the first and second connectors on said second and first panels respectively, but not to both at the same time, whereby either power block means of said opposed pair permits a second identical said electrical connector means to be releasably electrically joined thereto so that a third said panel can be disposed with an end edge thereof in the vicinity of the adjacent end edges of said first and second panels;

each of said first, second, third and fourth connectors having structure associated therewith for preventing accidental human contact with electrified conductors associated with the respective connector in the event the connectors defining said separable electrical connection are structurally disconnected from one another, such as when either connector on said electrical connector means becomes disconnected from its respective power block means whereas the other connector on said electrical connector means remains electrically joined to the other power block means; and at least one said power block means of said opposed pair also having at least one conventional two- or three-conductor electrical socket associated therewith and opening sidewardly of the respective panel.

* * * * *

UNITED STATES PATENT AND TRADEMARK OFFICE
CERTIFICATE OF CORRECTION

PATENT NO. : 4 370 008
DATED : January 25, 1983
INVENTOR(S) : Richard G. Haworth et al It is certified that error appears in the above-identified patent and that said Letters Patent is hereby corrected as shown below:

Column 14, line 41; change ":" to ---;---.
Column 16, line 19; change "Claim 2" to ---Claim 1---.
Column 17, line 54; change "air" to ---pair---.
Column 18, line 28; change "connections" to ---connector---.
Column 19, line 46; change "end" to ---ends---.
Column 21, line 63; change "Claim 28" to ---Claim 18---.
Column 22, line 15; delete "a".

Signed and Sealed this

Nineteenth Day of July 1983

[SEAL]

Attest:

GERALD J. MOSSINGHOFF

Attesting Officer  Commissioner of Patents and Trademarks

Disclaimer 4,370,008.—*Richard G. Haworth*, Holland; *Charles J. Saylor*, Zeeland and *Harold R. Wilson*, Holland, Mich. WALL PANEL WITH PREWIRED POWER SYSTEM. Patent dated Jan. 23, 1983. Disclaimer filed Feb. 27, 1985, by the assignee, *Haworth, Inc.*

The term of this patent subsequent to Nov. 13, 2001, has been disclaimed.
*[Official Gazette April 23, 1985.]*